United States Patent

Varrichione

[11] Patent Number: 5,548,918
[45] Date of Patent: Aug. 27, 1996

[54] FISHING LINE SAVER

[76] Inventor: Andy Varrichione, 1215 Clearview Dr., Port Charlotte, Fla. 33953

[21] Appl. No.: 453,371

[22] Filed: May 30, 1995

[51] Int. Cl.$^6$ ............................................. A01K 97/00
[52] U.S. Cl. ............................................................ 43/25
[58] Field of Search ...................................................... 43/25

[56] References Cited

U.S. PATENT DOCUMENTS

| | | | |
|---|---|---|---|
| 1,709,436 | 4/1929 | Koester | 43/25 |
| 2,183,445 | 12/1939 | Conterman | 43/25 |
| 2,791,858 | 5/1957 | Kernodle | 43/25 |
| 2,804,711 | 9/1957 | Kozar | 43/25 |
| 3,545,119 | 12/1970 | Murnan | 43/25 |
| 3,581,424 | 6/1971 | Bloom | 43/25 |
| 5,218,776 | 6/1993 | Wolf | 43/25 |
| 5,430,968 | 7/1995 | Watkins | 43/25 |

*Primary Examiner*—Kurt Rowan
*Attorney, Agent, or Firm*—Frank A. Lukasik

[57] ABSTRACT

A system and process for allowing a fisherman to remove kinks and twists from a fishing line by selectively applying and releasing pressure on the fishing line is provided. The system includes a fixed restraining member which members have depending opposed surfaces that are disposed under the fishing pole in the line of the fishing line support eye loops. Both members have extensions extending above the pole with the movable member pivotally connected to an actuator rod that is supported above the pole and terminates at a position substantially opposite to and above the spool and reel. The rod includes a lever arm at its end remote form the restraining members to form an extension suitable to be reached and acted upon by preferably the thumb of the fisherman. When so acted upon, the movable member can exert a restraining pressure on the fishing line by movement toward the fixed member, causing kinks and twists in the line to be spun off toward the water.

2 Claims, 4 Drawing Sheets

VIEW A-A

VIEW A-A 5,548,918

FISHING LINE SAVER

BACKGROUND OF THE INVENTION

1. Field of the Invention

This invention relates to an apparatus and method for removing conditions such as kinks and twists from a fishing line and more particularly to a system for clearing a line before it reaches a spool and reel by selectively applying a restraining pressure on the line by means positioned in the vicinity of the spool and reel and easily operable by the fisherman.

2. Description of the Prior Art

Heretofore, devices for tensioning, clearing and otherwise servicing a fishing line as it is being reeled in have been directed to causing the line to pass through, between or over obstacles in the path of the line as it is being reeled in. Such obstacles typically are secured to the pole or rod and are not controllable during the fishing operation. Furthermore, such fishing line control devices are directed to either clearing the line of debris or preventing twists from a single, fixed position or setting. For example, U.S. Pat. No. 2,700,787 to Trapanese concerns a slotted, resilient and cylindrical block having a transverse slit therein with a grooved opening, the block when clipped on a wet line presenting the opposed resilient surfaces of the slit so as to squeegee-like remove water from the line when the block is stopped at the end of the fishing rod and the line is reeled in.

U.S. Pat. No. 3,545,119 to Murnan discloses an attachment for preventing twist in monofilament fish lines comprising a pair of confronting mechanical fingers pivotally connected at their base ends and flared outwardly at their outer ends. The fingers are adapted to be clamped to a reel-equipped fishing rod and are lined with a compressible resilient anti-slipping material so that a minimal portion of fishing line can be seated yet slidingly drawn in tautly. There is no teaching or suggestion of controlling the pressure between rubber the inserts. Also, the reel presumably must be held above the fishing rod to preclude the line from dropping out of the attachment.

U.S. Pat. No. 4,156,983 to Moore concerns a fishing line tensioning device adapted for mounting on a fishing rod for tensioning fishing line as the line is being wound onto the reel. The tensioning device includes a body adapted to be secured to the fishing rod and having a peripheral recess that extends transversely to the longitudinal axis of the fishing rod; and a resilient wire secured to the body which, when deployed, extends across a portion of the recess so that a fishing line passing between the wire and the recess is snubbed when being reeled. The resiliency of the wire is overcome when a significant tug or jerk is imparted to the fishing line.

It can be readily be appreciated that these references, either singly or in combination, are not concerned with and do not suggest or infer the method and apparatus of the present invention for restraining a fishing line as well as allowing the fisherman to selectively activate or deactivate such restraining means by means positioned in the vicinity of the spool and reel.

SUMMARY OF THE INVENTION

Accordingly, it is an object of the invention to provide a system allowing a fisherman to remove kinks and twists from a fishing line by selectively applying and removing pressure on the fishing line during fishing operations.

It is another object of the invention to provide such a system wherein the restraining means may be released immediately after twists and kinks from a previous cast or casts have been removed.

It is still a further object of the invention to provide a restraining means that may be positioned remote from the spool or reel while allowing operation thereof at or in the vicinity of the spool or reel.

It is yet another object of the invention to provide a means for removing kinks and twists from a fishing line that allows normal casting and thereafter applies a slight pressure on the line while being reeled in so that kinks spin off toward the water and not on the reel or spool.

The foregoing objects are realized by the present invention in a system for pinching and releasing a fishing line at a point beyond at least the first eye loop outward of the spool and reel thereby when activated, removing kinks and twists in the line from that point to the water. The system includes a fixed restraining member and a movable restraining member which members have depending opposed surfaces that are disposed under the fishing pole in the line of the fishing line support eye loops. Both members have extensions extending above the pole, with the movable member pivotally connected to an actuator rod that is supported above the pole and terminates at a position substantially opposite to and above the spool and reel. The rod preferably includes a lever arm that is mounted at substantially a right angle at its end remote from the restraining members to form an extension suitable to be reached and acted upon by preferably the thumb of the fisherman. The lever arm is in effect a thumb extension for rotating the rod, and thereby the movable member, either toward or away from the fixed member, resulting in a line saver device that can exert pressure on the fishing line, when desired, to preclude twists and kinks from reaching the spool and reel or release such pressure when desired.

BRIEF DESCRIPTION OF THE DRAWINGS

The foregoing and further objects of the invention will become apparent from reading the following detailed description of preferred embodiments of the invention in which.

DETAILED DESCRIPTION OF THE INVENTION

Figure 1:
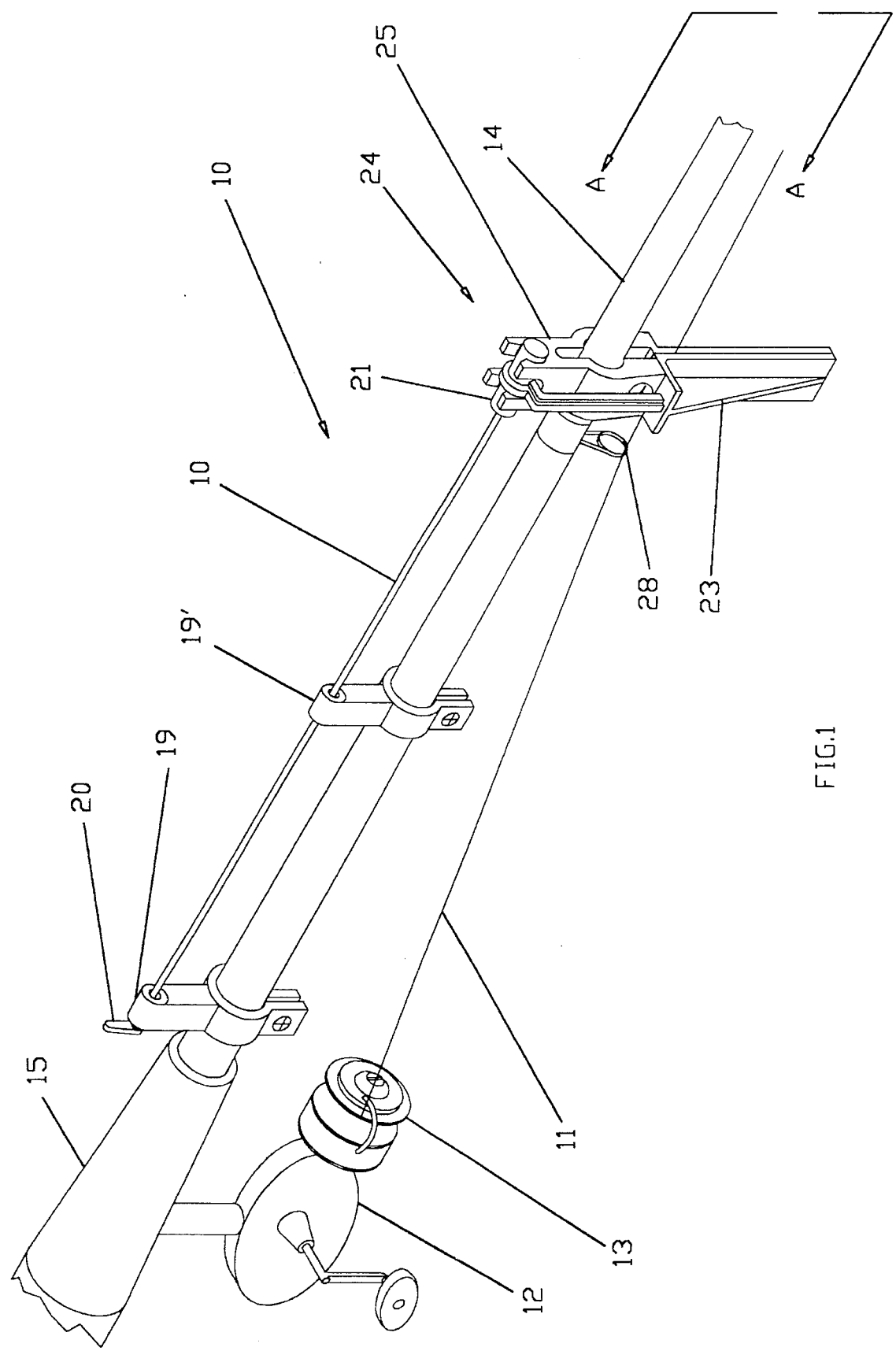
FIG. 1 is a perspective view of the invention mounted on a fishing pole shown in phantom with reel and spool.

Turning now to the drawings, more particularly to FIG. 1, there is shown the assembly of the fishing line saver of the invention, designated generally by the numeral 10 and in phantom a fishing line 11 extending from a fishing reel 12 and spool 13 mounted on a fishing pole 14 having a handle 15. The invention is shown in solid lines and includes an actuating rod 17 that is supported by brackets 19 and 19' and has a lever arm 20 secured to one end and a cylinder 21 secured to the opposite end. Cylinder 21 in turn has secured to it a pivotable restraining member 23. The restraining assembly is shown at 24 and includes a fixed restraining member 25, assembly 24 in this embodiment being shown to be positioned adjacent to an eye loop 28 from spool 13.

Figure 4:
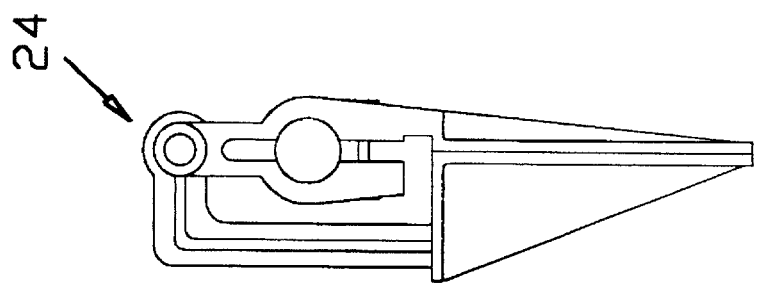
FIG. 4 is an end elevation of the blocks in the closed position taken substantially along the line A—A in FIG. 1.
Figure 3:
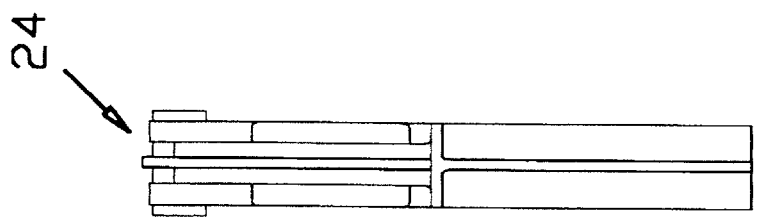
FIG. 3 is a side elevation, of the assembled blocks.
Figure 2:
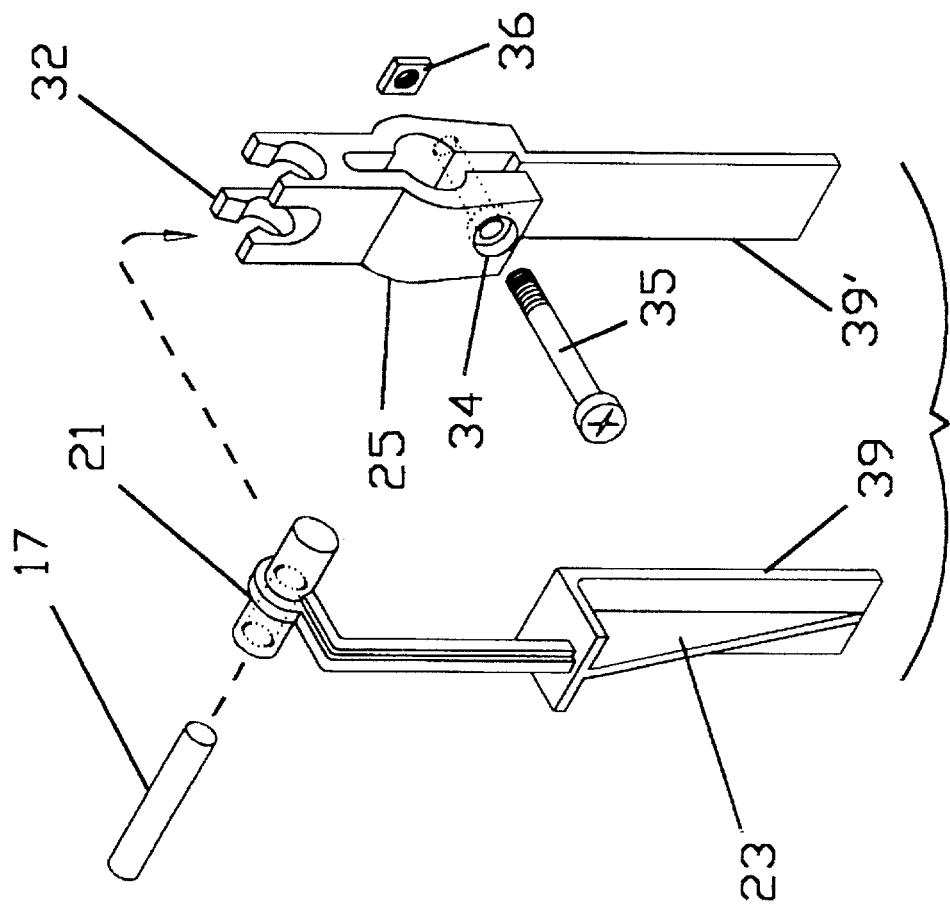
FIG. 2 is an exploded, perspective view of the fixed and movable blocks and mounting components.

FIGS. 2–4 show a preferred embodiment of the restraining assembly of the invention. Pivotable member 23 is lockingly engaged with cylinder 21 in a conventional manner, and fixed member 25 is provided with a bracket 32 formed to rotatably receive cylinder 21.therein. A retaining bolt hole 34 is provided in fixed member 25 to receive a retaining bolt 35 so that the fixed member 25 may be secured to pole 14, (not shown) by tightening a nut 36. Pivotal member 23 and fixed member 25 have opposed gripping faces 39 and 39', respectively, which may be made of rubber, to create sufficient pressure when a fishing line (not shown) is held therebetween to preclude kinks and twists in the line from passing rearward to spool 13 as shown in FIG. 1. In FIG. 3 the restraining assembly is shown in side elevation, while in FIG. 4 the restraining assembly is shown in end elevation in the closed position before a fishing line is engaged therebetween.

Figure 5:
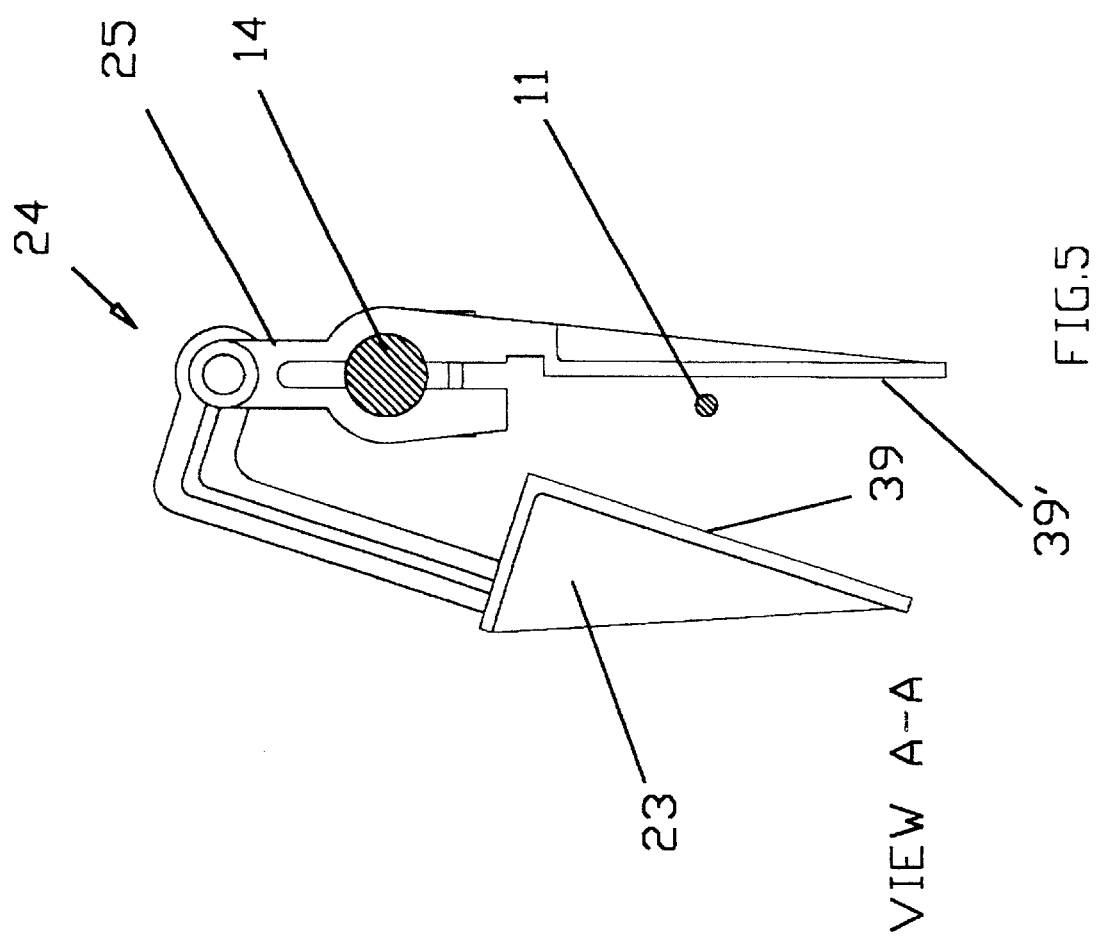
FIG. 5 is an end elevation of the blocks in the open position taken substantially along the line A—A in FIG. 1.

FIG. 5 illustrates the invention in operation, with fishing line 11 passing between faces 39 and 39'. It will be appreciated that line 11 may be engaged by the faces at any position along their height as will be explained more in detail when the operation of the invention is described.

Figures 6, 7:
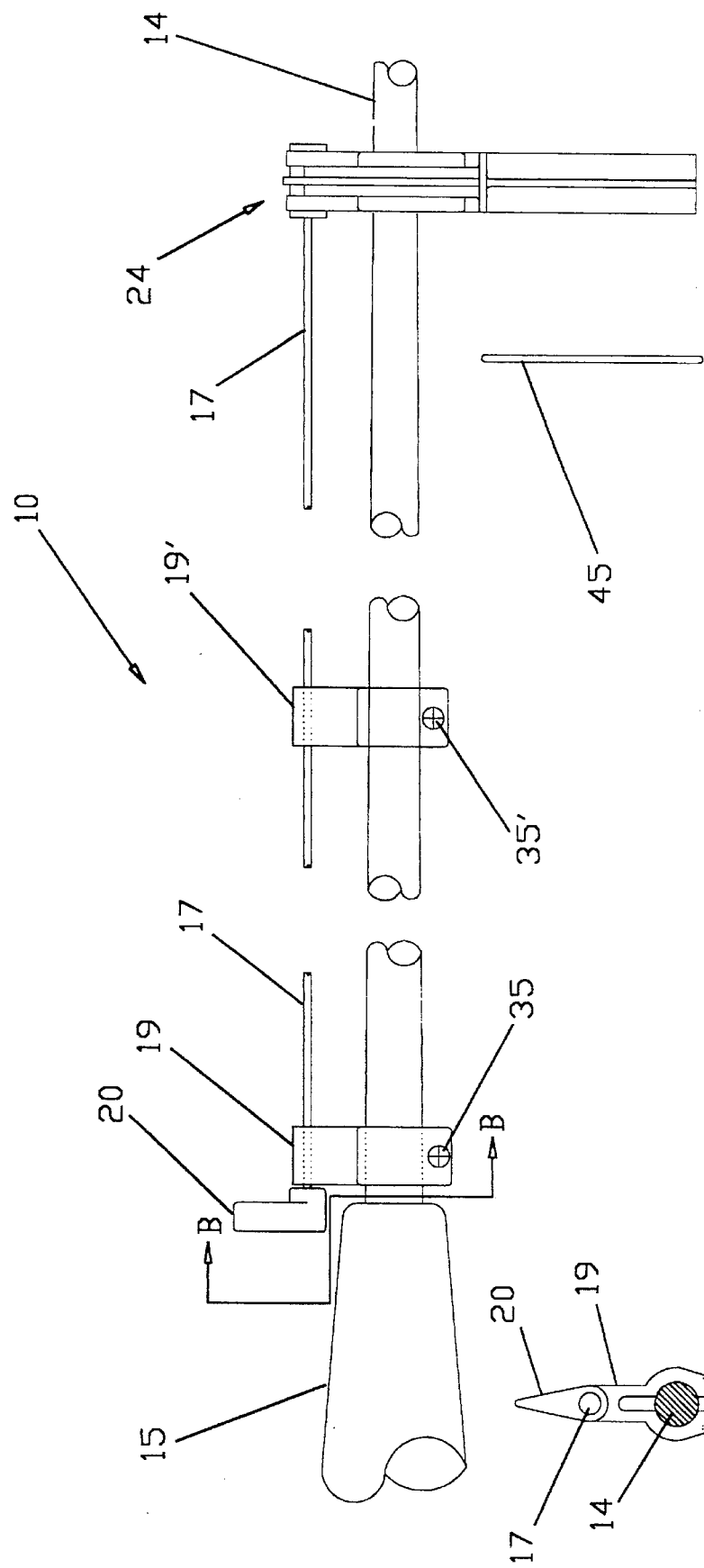
FIG. 6 is a side elevation of an exploded view of the invention.
FIG. 7 is an end view of the actuating lever and mounting components taken substantially along the line B—B in FIG. 6.

FIG. 6 shows the manner in which actuating rod 17 may be mounted for operation on pole 14. In this embodiment, brackets 19 and 19' are secured to pole 14 by a pair of retaining bolts 35 and 35', respectively and lock nuts 36, one of which is shown in FIG. 7. Restraining assembly 24 is shown mounted forward of an eye loop 45 which preferably is the initial eye loop through which line 11 passes, although it may be located closer to the tip of the pole 14. In FIG. 7, one embodiment of lever arm 20 is shown as a tab extending transverse to the longitudinal axis of pole 14 and of sufficient length to allow a desired pressure to be applied thereto, preferably by the thumb of the fisherman.

In operation, with the invention secured to a fishing pole and a line having been cast with member 23 in the open position shown in FIG. 5, a fisherman, before reeling in the line and desiring to remove kinks and twists in the line, need only to rotate lever arm 20 clockwise sufficiently to create and maintain a slight pressure by the substantial abutment of faces 39 and 39' on the fishing line between them. The appropriate amount of applied pressure will cause all or substantially all kinks and twists to spin off towards the water in lieu of being carried to spool 13. In addition, by putting drag on the line 11, and thus keeping the line tight to the spool, the line 11 is wound more tightly than it would be without drag and essentially eliminates tangles which may occur if the line is loosely wound.

Thus a line saver device and method has been described that increases the life of a fishing or other line similarly used by applying a light pressure on the line sufficient to cause it to be retarded or slowed while being reeled in. This application of pressure on the line is obtained by keeping a slight pressure on lever arm 20 so as to rotate pivotable member 23 toward fixed member 25. The amount of pressure may be varied constantly as desired while viewing the effect of the pressure on the line as it is being drawn between gripping faces 39 and 39' of restraining assembly 24. The gripping faces may be made of or coated with any anti-slipping material such as treated rubber, compacted fiber or the like and should not be so resilient as to grasp or snub the fishing line unless extreme pressure is exerted on lever arm 20. Also, the members may be made entirely of vulcanized rubber. In addition, lever arm 20 may be an integral part of actuating rod 17 bent up a sufficient amount to permit a user's thumb to swivel the rod counterclockwise to open the restraining members and clockwise, in the preferred embodiment, to bring faces 39 and 39'toward each other.

Although this invention has been disclosed and described with reference to a preferred embodiment its principles are susceptible to other applications which will be apparent to persons skilled in the art. For example, the restraining members may be a clamping device and surfaces 39 and 39' may be coated with a thin film of rubber or other anti-slipping compound, or the restraining members may be blocks of rubber adapted to function as the described restraining members. Thus, may modifications, additions, and deletions may be made to the invention without departure from the scope of the invention as set forth in the following claims.

What is claimed is:

1. A line saver device for attachment to a fishing pole having eye loops deployed therealong and a spool, said device comprising:

a first and a second bracket affixed to said pole, a restraining member affixed to said pole and positioned adjacent to and forward of a first eye loop from the spool, said restraining member consisting of a fixed member having a bracket formed to rotatably receive a cylinder therein, a pivotal member lockingly engaged with a cylinder, said cylinder rotatably mounted in said fixed member said fixed member and said pivotal member having opposed gripping faces formed thereon, and a lever arm affixed to an actuating arm said lever arm having a protrusion extending uprightly with respect to a longitudinal axis of said fishing pole for enabling said pivotable member to be rotated alternately toward and away from said fixed member, said actuating arm rotatably supported by said first and second brackets, said actuating arm connected to said cylinder, said pivotal member adapted to create sufficient pressure when actuated by said lever arm to grip said fishing line to preclude kinks and twists in the line from passing rearward to the spool, and to release said pressure when desired, said pressure being varied constantly as desired while viewing the effect of the pressure on the line as it is being drawn between said gripping faces.

2. The device as defined in claim 1 wherein said first and second brackets and said restraining member are secured to the pole with retaining bolts, and said gripping faces are coated with an anti-slipping material.

\* \* \* \* \*